United States Patent
Kawanaka et al.

(10) Patent No.: US 8,789,645 B2
(45) Date of Patent: Jul. 29, 2014

(54) ELECTRIC POWER STEERING DEVICE

(75) Inventors: Yasuhiro Kawanaka, Chiyoda-ku (JP); Takahiro Okanoue, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 474 days.

(21) Appl. No.: 13/269,066

(22) Filed: Oct. 7, 2011

(65) Prior Publication Data

US 2012/0261207 A1 Oct. 18, 2012

(30) Foreign Application Priority Data

Apr. 18, 2011 (JP) ................................. 2011-092023

(51) Int. Cl.
  *B62D 5/04* (2006.01)

(52) U.S. Cl.
  CPC .............. *B62D 5/046* (2013.01); *B62D 5/0463* (2013.01); *B62D 5/0481* (2013.01)
  USPC .............................. 180/404; 180/446; 701/43

(58) Field of Classification Search
  CPC ........ B62D 5/04; B62D 5/046; B62D 5/0463; B62D 5/0472; B62D 5/0481
  USPC ................. 180/404, 444, 446; 701/41, 42, 43
  See application file for complete search history.

(56) References Cited

U.S. PATENT DOCUMENTS

| | | | |
|---|---|---|---|
| 5,552,684 A * | 9/1996 | Wada et al. | 318/293 |
| 6,008,599 A * | 12/1999 | Beck | 318/400.29 |
| 6,497,303 B1 * | 12/2002 | Nishimura et al. | 180/446 |
| 8,392,069 B2 * | 3/2013 | Murty et al. | 701/43 |
| 2007/0199764 A1 * | 8/2007 | Kifuku et al. | 180/446 |
| 2009/0288907 A1 * | 11/2009 | Collier-Hallman et al. | 180/446 |

FOREIGN PATENT DOCUMENTS

JP 2506269 B2 6/1996

* cited by examiner

*Primary Examiner* — Anne Marie Boehler
(74) *Attorney, Agent, or Firm* — Sughrue Mion, PLLC

(57) ABSTRACT

An electric power steering device includes: a fail-safe power relay (9a) and a motor relay (10a) for interrupting power supply to an electric-motor driving unit for driving an electric motor for applying an assist torque for steering performed by a driver; and a relay driving circuit (8a) including a switch (13a) connected in parallel to drive coils of the relays (9a and 10a) and a diode (16a). A target value of a relay-contact energizing current is lowered and the relays (9a and 10a) are gradually interrupted while an amount of current corresponding to a back surge generated when the relays are turned OFF is caused to flow back to the diode (16a) of the relay driving circuit (8a) in a normal relay-OFF operation, whereas the relays (9a and 10a) are quickly interrupted without operating the relay driving circuit (8a) in case of detection of an abnormality.

4 Claims, 5 Drawing Sheets

ELECTRIC POWER STEERING DEVICE

BACKGROUND OF THE INVENTION

1. Field of the Invention

The present invention relates to an electric power steering device, in particular, to an electric power steering device for exerting power of an electric motor on a vehicle steering system to reduce a steering force.

2. Description of the Related Art

As described in, for example, Japanese Patent No. 2506269, a conventional electric power steering device includes failure detection means for monitoring a PWM signal of electric-motor driving means and determining the occurrence of an abnormality in the electric power steering device based on the PWM signal to generate an abnormality signal. When the abnormality occurs, a relay circuit is interrupted based on the abnormality signal so as to stop power supply to the electric-motor driving means.

As described above, the electric power steering device described in Japanese Patent No. 2506269 includes the above-mentioned failure detection means which interrupts the relay circuit based on the abnormality signal so as to stop the power supply to the electric-motor driving means. Therefore, the electric power steering device can be protected from every abnormality which affects the PWM signal.

In Japanese Patent No. 2506269, the following fail-safe power relay is proposed. The fail-safe power relay is provided between a power source for a vehicle and the electric-motor driving means to stop the power supply to the electric-motor driving means in case of occurrence of an abnormality.

In recent years, noise reduction of on-vehicle electronic devices has been demanded. However, Japanese Patent No. 2506269 has a problem in that no measure for noise-reduction has been taken.

In the automobile industry of recent years, a method of gradually performing a mechanical relay-OFF operation as the measures for noise-reduction has been proposed. According to the method, however, the mechanical relay is gradually interrupted in a state in which the mechanical relay is energized even when an abnormality occurs in the electric power steering device. Therefore, an arc discharge occurs between contacts of the mechanical relay to disadvantageously lower contact welding resistance. Therefore, the above-mentioned method has much restriction on an effective interrupting-current capacity. Thus, the application of the above-mentioned method to high-output products is limited. Therefore, the above-mentioned method has a problem of lack in practicality. Moreover, when the contact welding occurs, there is a fear in that the stop of power supply to the electric-motor driving means in case of occurrence of the abnormality, which is expected as a function of the mechanical relay of the electric power steering device, cannot be performed.

SUMMARY OF THE INVENTION

The present invention has been made to solve the problems described above, and has an object to provide an electric power steering device having both safety and comfort, which performs a normal relay-OFF operation in a gradual manner to reduce operating noise and performs the relay-OFF operation at a high speed in case of detection of an abnormality so as to maintain the safety.

According to the present invention, there is provided an electric power steering device, including: electric-motor driving means for driving an electric motor for applying an assist torque to steering performed by a driver; at least one relay for interrupting power supply to the electric-motor driving means; steering-force detection means for detecting a steering force of the driver; control means for generating an electric-motor control signal for controlling an output torque of the electric motor based at least on results of detection by the steering-force detection means and outputting the electric-motor control signal to the electric-motor driving means; failure detection means for detecting an abnormality in the electric power steering device; and relay gradual interruption means including switch means connected in parallel to a drive coil included in the at least one relay and a diode connected in series to the switch means, in which: the relay gradual interruption means is for turning the switching means ON so as to cause an amount of current corresponding to aback surge generated at ends of the drive coil to flow back to the diode when an exciting voltage of the drive coil of the at least one relay is turned OFF; and when the failure detection means does not detect the abnormality in the electric power steering device, the control means lowers a target value of a relay-contact energizing current, operates the relay gradual interruption means, and then interrupts the at least one relay, and when the failure detection means detects the abnormality in the electric power steering device, the control means interrupts the at least one relay without operating the relay gradual interruption means.

According to the present invention, there is provided the electric power steering device, including: the electric-motor driving means for driving the electric motor for applying the assist torque to the steering performed by the driver; the at least one relay for interrupting the power supply to the electric-motor driving means; the steering-force detection means for detecting the steering force of the driver; the control means for generating the electric-motor control signal for controlling the output torque of the electric motor based at least on the results of detection by the steering-force detection means and outputting the electric-motor control signal to the electric-motor driving means; the failure detection means for detecting the abnormality in the electric power steering device; and the relay gradual interruption means including the switch means connected in parallel to the drive coil included in the at least one relay and the diode connected in series to the switch means, in which: the relay gradual interruption means is for turning the switching means ON so as to cause the amount of current corresponding to the back surge generated at the ends of the drive coil to flow back to the diode when the exciting voltage of the drive coil of the at least one relay is turned OFF; and when the failure detection means does not detect the abnormality in the electric power steering device, the control means lowers the target value of the relay-contact energizing current, operates the relay gradual interruption means, and then interrupts the at least one relay, and when the failure detection means detects the abnormality in the electric power steering device, the control means interrupts the at least one relay without operating the relay gradual interruption means. Thus, it is possible to realize the electric power steering device having both safety and comfort, which performs the normal relay-OFF operation in a gradual manner to reduce the operating noise and performs the relay-OFF operation at a high speed in case of detection of the abnormality so as to maintain the safety.

DETAILED DESCRIPTION OF THE PREFERRED EMBODIMENT

Embodiment 1

Figure 1:
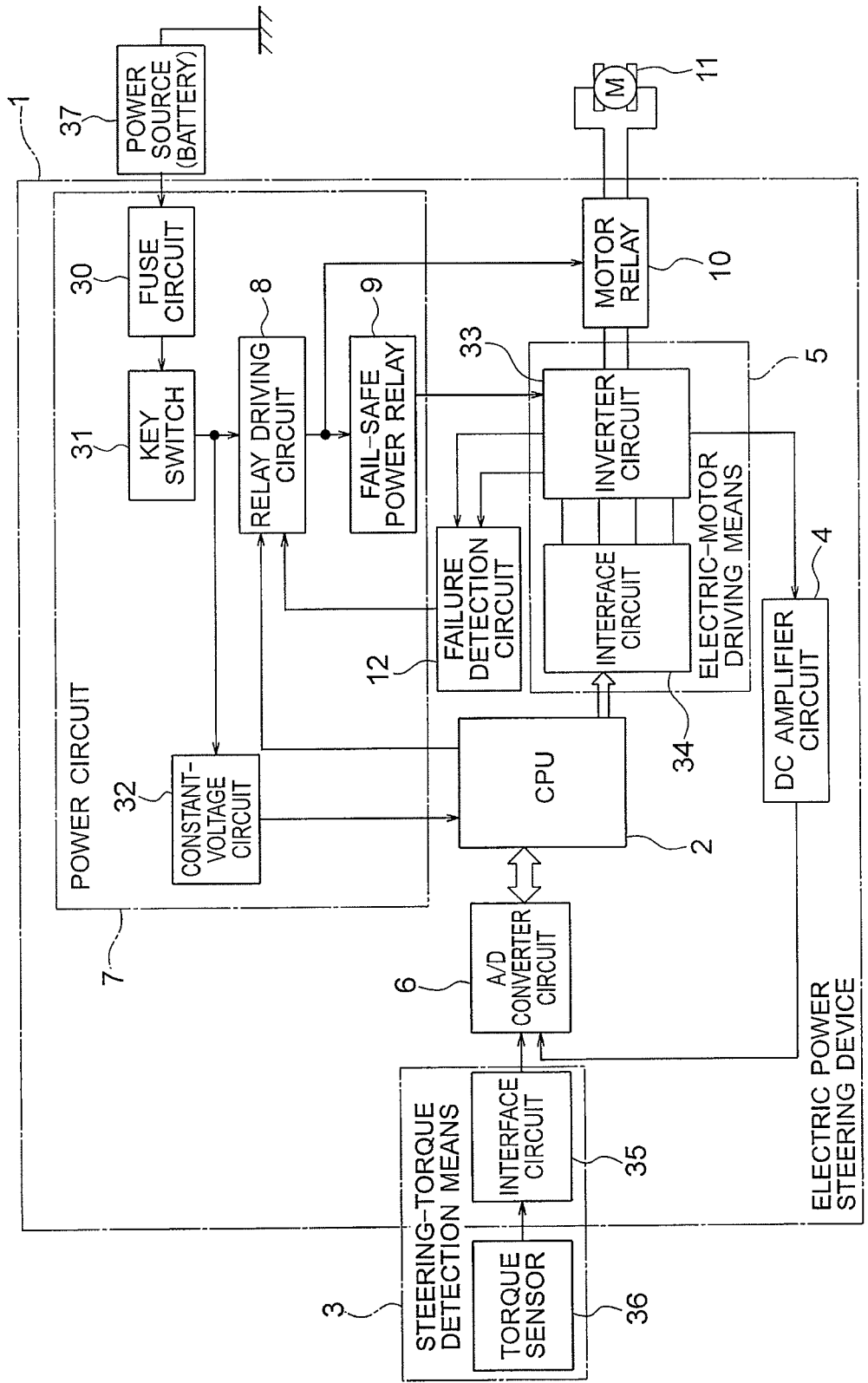
FIG. 1 is a block diagram illustrating an electric power steering device according to Embodiment 1 of the present invention.

Hereinafter, an embodiment of the present invention is described with reference to the accompanying drawings. FIG. 1 is a block diagram illustrating a configuration of an electric power steering device according to Embodiment 1. As illustrated in FIG. 1, an electric power steering device 1, a torque sensor 36, a power source 37 for the electric power steering device 1, and an electric motor 11 are provided. The torque sensor 36 is connected to an interface circuit 35. The torque sensor 36 and the interface circuit 35 constitute steering-torque detection means 3 (steering-force detection means).

An overall operation of the electric power steering device 1 is described.

The electric power steering device 1 is provided to a vehicle such as an automobile so as to assist a steering force by the electric motor 11.

When a handle (not shown) provided to the vehicle is operated by a driver, a torsion is generated in a steering shaft (not shown) connected to the handle by a rotation torque applied by the driver. The torque sensor 36 detects the rotation torque based on the torsion and inputs a rotation torque signal to the electric power steering device 1 through the interface circuit 35. The electric power steering device 1 obtains a rotation angle of the electric motor 11 and energizes the electric motor 11 with a current according to the rotation torque detected by the torque sensor 36, according to the rotation angle. When being energized, the electric motor 11 generates an assist torque according to the current so as to apply an assisting force to the steering shaft. In this manner, the steering shaft is rotated, and hence an axle (not shown) is horizontally moved by the action of a gear provided at a distal end of the steering shaft. The axle is engaged so as to be approximately vertical to the steering shaft. Two wheels of the vehicle are provided to both ends of the axle. Therefore, a steering angle of both of the wheels of the vehicle is changed by the rotation of the steering shaft.

Hereinafter, an internal configuration of the electric power steering device 1 is described.

As illustrated in FIG. 1, the electric power steering device 1 includes a CPU 2. The CPU 2 is driven by a power circuit 7. Electric power is supplied from the power source 37 to the power circuit 7. The CPU 2 is connected to the steering-torque detection means 3 through an A/D converter circuit 6. The electric power steering device 1 includes a DC amplifier circuit 4 and electric-motor driving means 5. The CPU 2 is connected to an inverter circuit 33 included in the electric-motor driving means 5 the A/D converter circuit 6 and the DC amplifier circuit 4. Detection signals from the steering-torque detection means 3 and the DC amplifier circuit 4 are input to the CPU 2 through the A/D converter circuit 6. The CPU 2 determines an electric-motor control signal based on the detection signals and inputs the electric-motor control signal to the electric-motor driving means 5. The electric-motor driving means 5 energizes the electric motor 11 through a motor relay 10 based on the electric-motor control signal.

As illustrated in FIG. 1, the power circuit 7 includes a relay driving circuit (relay gradual interruption means) 8, a fail-safe power relay 9, a fuse circuit 30, a key switch 31, and a constant-voltage circuit 32.

The electric-motor driving means 5 includes the inverter circuit 33 and an interface circuit 34.

As illustrated in FIG. 1, the electric power steering device 1 includes a failure detection circuit 12 as abnormality detection means in case of occurrence of an abnormality. When the failure detection circuit 12 detects an abnormality, the CPU 2 interrupts the relay driving circuit 8 to stop the power supply from the power source 37 to the electric-motor driving means 5.

The fail-safe power relay 9 is provided between the power source 37 and the electric-motor driving means 5 so as to stop the power supply to the inverter circuit 33 of the electric-motor driving means 5.

Further, the motor relay 10 is provided between the electric motor 11 and the inverter circuit 33 of the electric-motor driving means 5 for protection against a brake mode when the electric motor 11 is switched to operate in the brake mode.

Figure 2:
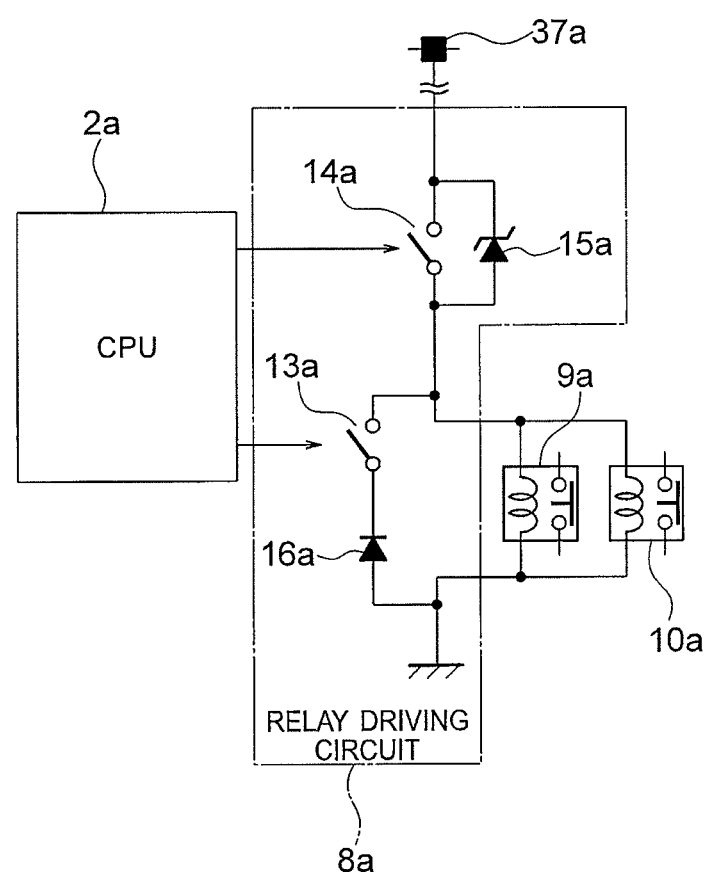
FIG. 2 is a circuit diagram illustrating a configuration of a relay driving circuit for the electric power steering device according to Embodiment 1 of the present invention.

FIG. 2 is a diagram illustrating an example of the relay driving circuit 8 (hereinafter, referred to as "relay driving circuit 8a") according to Embodiment 1. In FIG. 2, all the reference symbols contain the letter "a" at the end. Each of the components corresponds to the component illustrated in FIG. 1, which is denoted by the same reference symbol without the letter "a". Specifically, for example, a CPU 2a corresponds to the CPU 2 illustrated in FIG. 1. In FIG. 2, the relay driving circuit 8a includes a switch SW-1 13a, a diode 16a, a switch SW-2 14a, and a zener diode 15a. The switch SW-1 (13a) is connected in series to the diode 16a and is connected in parallel to each of a fail-safe power relay 9a and a motor relay 10a. The switch SW-2 (14a) and the zener diode 15a are connected in parallel to each other. The relay driving circuit 8a has the configuration described above. An ON/OFF operation of each of the switch SW-1 (13a) and the switch SW-2 (14a) is controlled by using a driving signal from the CPU 2a as a trigger.

The relay driving circuit 8a includes the switch SW-1 (13a) and the diode 16a. The switch SW-1 (13a) is connected in parallel to each of a drive coil included in the fail-safe power relay 9a and a drive coil included in the motor relay 10a. The diode 16a is connected in series to the switch SW-1 (13a). When an exciting voltage of the drive coil of the fail-safe power relay 9a and the drive coil of the motor relay 10a is turned OFF, the switch SW-1 (13a) is turned ON to cause the amount of current corresponding to a back surge generated at ends of the drive coils to flow back to the diode 16a so as to perform a relay-OFF operation in a gradual manner. For a normal relay-OFF operation, the above-mentioned operation of the relay driving circuit 8a is performed. On the other hand, for a relay-OFF operation in case of detection of an abnormality, the above-mentioned operation of the relay driving circuit 8a is not performed.

When the normal relay-OFF operation is performed, FETs provided to the inverter circuit 33 are all turned OFF so as to lower a relay contact current at contacts of the fail-safe power relay 9a and the motor relay 10a. As a result, a target current value of a relay-contact energizing current is lowered. Therefore, the switch SW-1 (13a) can be turned ON, whereas the SW-2 (14a) can be turned OFF by the CPU 2a in a state in which an arc does not occur between the relay contacts. In this manner, each of the drive coil of the fail-safe power relay 9a and the drive coil of the motor relay 10a is de-excited. As a result, the back surge is generated at the ends of each of the drive coils. The amount of current corresponding to the generated back surge is caused to flow back to the diode 16a because the switch SW-1 (13a) is turned ON. As a result, a relay-coil exciting current gradually decays to gradually interrupt the fail-safe power relay 9a and the motor relay 10a.

Each of the switch SW-1 (13a) and the switch SW-2 (14a) illustrated in FIG. 2 can be easily configured by using a semiconductor switching element such as, for example, a bipolar transistor.

Figure 3:
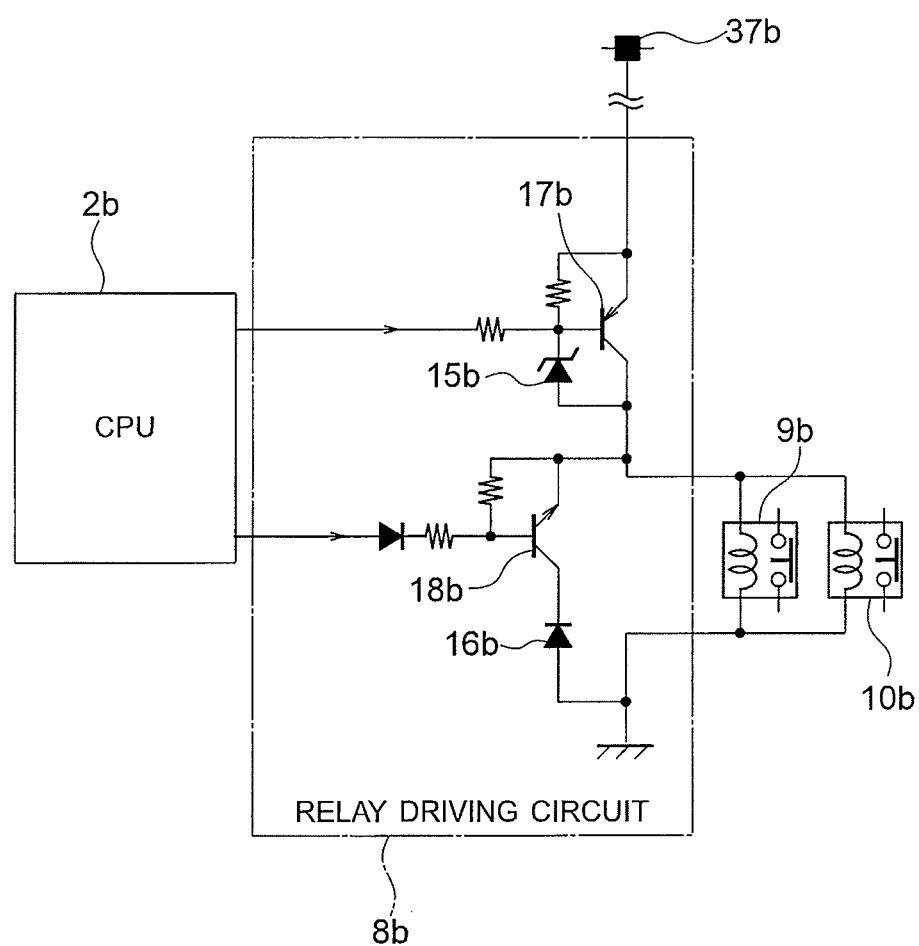
FIG. 3 is a circuit diagram illustrating an example of the relay driving circuit for the electric power steering device according to Embodiment 1 of the present invention.

FIG. 3 illustrates an example where the circuit illustrated in FIG. 2 is configured by using a specific relay driving circuit. In FIG. 3, all the reference symbols contain the letter "b" at the end. Each of the components corresponds to the components illustrated in FIGS. 1 and 2, which are denoted by the same reference symbols without the letters "b". In FIG. 3, the switch SW-1 (13a) illustrated in FIG. 2 is configured by a switching transistor 1 (18b). The switch SW-2 (14a) illustrated in FIG. 2 is configured by a switching transistor 2 (17b). An ON/OFF operation of each of the switching transistor 1 (18b) and the switching transistor 2 (17b) is controlled by using a driving signal from a CPU 2b as a trigger. In the configuration illustrated in FIG. 3, the transistor, specifically, the semiconductor switching element is used as each of the switch SW-1 (13a) and the switch SW-2 (14a). Therefore, operating noise is not additionally generated with an operation of the circuit described above.

Figure 4:
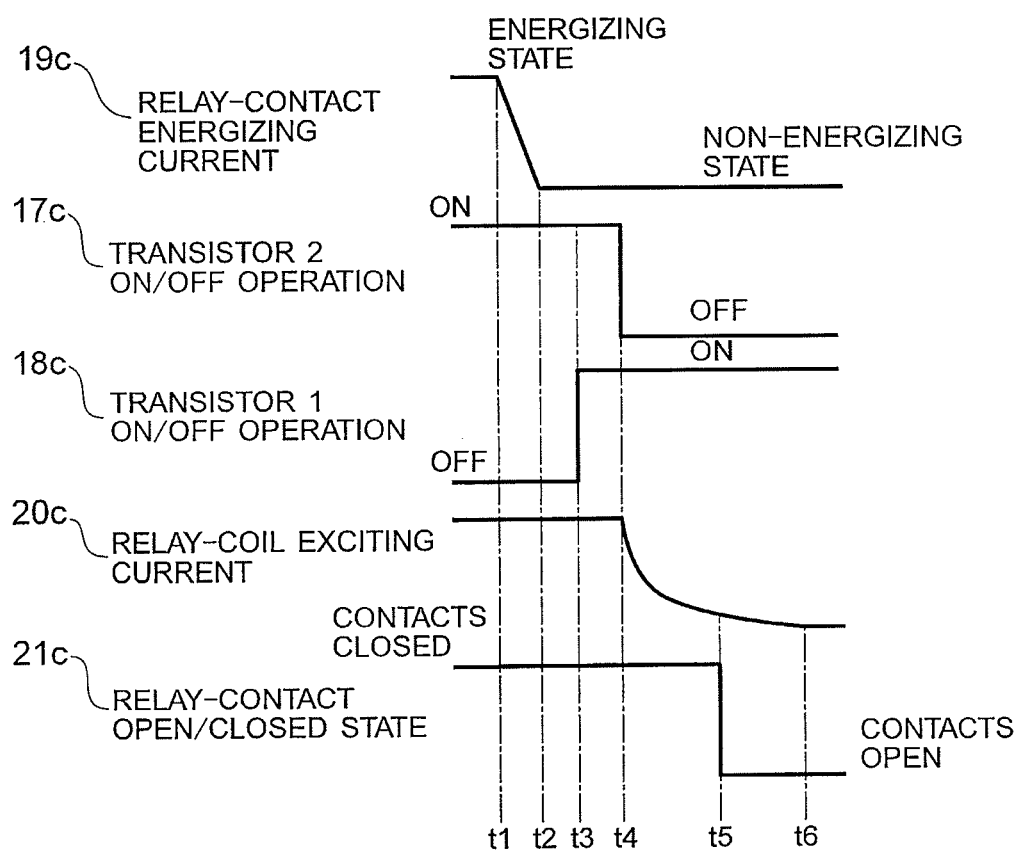
FIG. 4 is a timing chart illustrating a normal operation (free-wheeling diode method) of the relay driving circuit for the electric power steering device according to Embodiment 1 of the present invention.

FIG. 4 is a timing chart illustrating an operation of the relay driving circuit illustrated in FIG. 3. FIG. 4 illustrates the normal relay-OFF operation of the relay driving circuit. As described above, when the relay driving circuit 8b is turned OFF, the back surge is generated at ends of each of a drive coil of a fail-safe power relay 9b and a drive coil of a motor relay 10b. Therefore, the amount of current corresponding to the back surge is made to flow back to a diode 16b so as to gradually decay the relay driving current.

In FIG. 4, a transistor 1 ON/OFF operation 18c corresponds to a timing chart of an ON/OFF operation of the switching transistor 1 (18b) illustrated in FIG. 3.

Further, similarly, in FIG. 4, a transistor 2 ON/OFF operation 17c corresponds to a timing chart of an ON/OFF operation of the switching transistor 2 (17b) illustrated in FIG. 3.

Further, in FIG. 4, a relay-coil exciting current 20c corresponds to a timing chart of the current for energizing the drive coil of the fail-safe current relay 9b and the drive coil of the motor relay 10b illustrated in FIG. 3.

Further, in FIG. 4, a relay-contact energizing current 19c corresponds to a timing chart of a current for energizing the relay contacts.

Further, in FIG. 4, a relay-contact open/closed state 21c corresponds to a timing chart of an open/closed state of the relay contacts.

Moreover, in FIG. 4, each of t1, t2, t3, t4, and t5 is a time at which an operation serving as a trigger is performed.

As illustrated in FIG. 4, until time t1, the relay-contact energizing current 19c is held in an energizing state. Between time t1 and time t2, the target value of the relay-contact energizing current 19c is lowered. The relay-contact energizing current 19c is gradually lowered by PWM control of the inverter circuit 33 included in the electric-motor driving means 5 illustrated in FIG. 1 so as to be placed in a non-energizing state at time t2. At time t2, the switching transistor 2 (17b) illustrated in FIG. 3 is in an ON state, whereas the switching transistor 1 (18b) is in an OFF state.

Next, at time t3, the switching transistor 1 (18b) illustrated in FIG. 3 is turned ON. On the other hand, the switching transistor 2 (17b) illustrated in FIG. 3 remains in the ON state. As a result, an energization path for causing the amount of current corresponding to the back surge generated at both ends of each of the drive coils to flow back to the diode 16b when the fail-safe power relay 9b and the motor relay 10b are turned OFF is formed.

Next, at time t4, the switching transistor 2 (17b) illustrated in FIG. 3 is turned OFF. As a result, the exciting voltage of the fail-safe power relay 9b and the motor relay 10b illustrated in FIG. 3 is turned OFF. Therefore, between time t4 and time t6, the relay-coil exciting current 20c decays. On the other hand, the switching transistor 1 (18b) illustrated in FIG. 3 remains in the ON state. Therefore, the amount of current corresponding to the back surge generated at both ends of each of the drive coils is caused to flow back to the diode 16b. By the backflow of the current, the relay-coil exciting current 20c decays gradually between time t4 and time t6.

FIG. 4 illustrates that the relay-contact open/closed state 21c transits from the closed state to the open state at time t5 because the relay-coil exciting current 20c becomes equal to or smaller than a predetermined current which is necessary for maintaining a relay-ON state.

Next, the case where an abnormality occurs in the electric power steering device with the circuit configuration illustrated in FIG. 3 is described.

When an abnormality occurs, the CPU 2b does not turn the switching transistor 1 (18b) ON but turns the switching transistor 2 (17b) OFF without lowering the target value of the relay-contact energizing current 19c for energizing the contacts of the fail-safe power relay 9b and the motor relay 10b. As a result, the drive coil of the fail-safe power relay 9b and the drive coil of the motor relay 10b are de-excited. Therefore, the amount of current corresponding to the back surge generated at the ends of the drive coils does not flow back to the diode 16b, and the back surge is absorbed to be equal to a zener voltage of the zener diode 15b. Therefore, the back surge is absorbed to be a forward voltage of the diode 16b. Accordingly, as compared with the case where the normal relay-OFF operation is performed, a recovery time of the fail-safe power relay 9b and the motor relay 10b is reduced.

Figure 5:
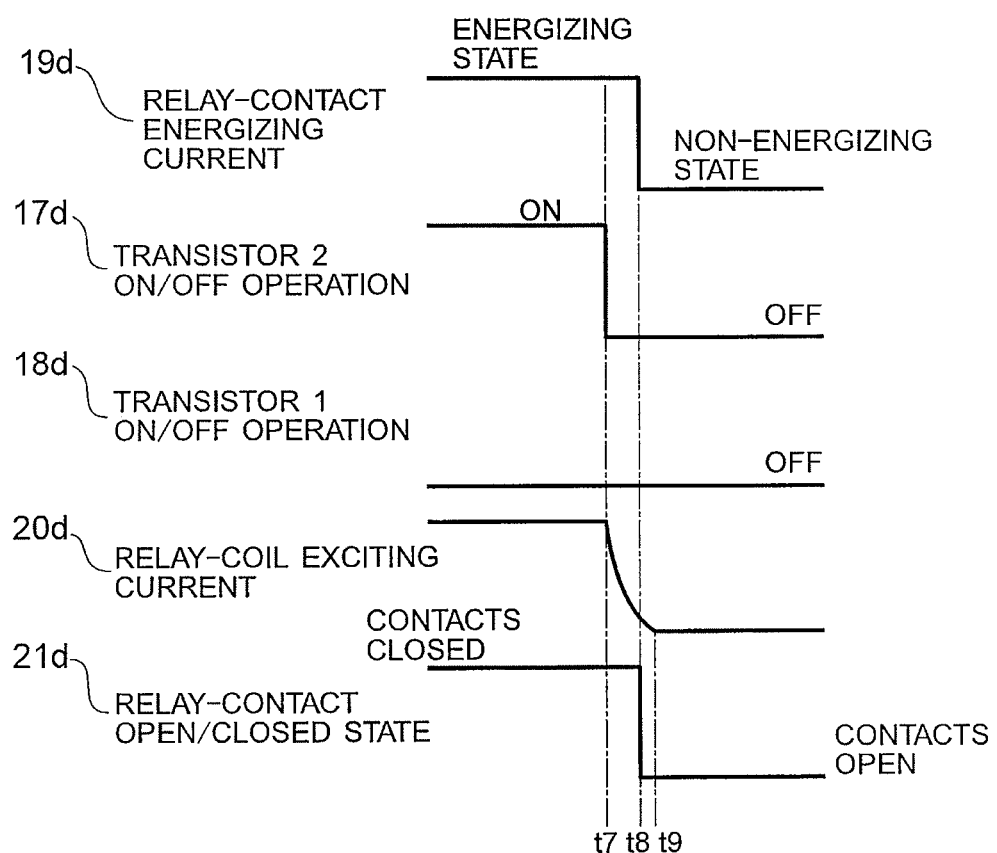
FIG. 5 is a timing chart illustrating an operation of the relay driving circuit for the electric power steering device in case of detection of an abnormality (high-speed interruption method) according to Embodiment 1 of the present invention.

FIG. 5 is a timing chart illustrating a relay-OFF operation of the relay driving circuit having the configuration of the example illustrated in FIG. 3 in case of occurrence of the abnormality.

First, in FIG. 5, a transistor 1 ON/OFF operation (18d) corresponds to a timing chart of an ON/OFF operation of the switching transistor 1 (18b) illustrated in FIG. 3.

Further, similarly, in FIG. 5, a transistor 2 ON/OFF operation (17d) corresponds to a timing chart of an ON/OFF operation of the switching transistor 2 (17b) illustrated in FIG. 3.

Further, in FIG. 5, a relay-coil exciting current 20d corresponds to a timing chart of the exciting current for energizing the drive coil of the fail-safe current relay 9b and the drive coil of the motor relay 10b illustrated in FIG. 3.

Further, in FIG. 5, a relay-contact energizing current 19d corresponds to a timing chart of a current for energizing the relay contacts.

Further, in FIG. 5, a relay-contact open/closed state 21d corresponds to a timing chart of an open/closed state of the relay contacts.

Moreover, in FIG. 5, each of t7, t8, and t9 is a time at which an operation serving as a trigger is performed.

In the relay-OFF operation illustrated in FIG. 5, the relay-contact energizing current 19d is not gradually decreased by the PWM control of the inverter circuit 33 included in the electric-motor driving means 5 illustrated in FIG. 1. Therefore, while the relay-contact energizing current 19d is held in the energizing state, the switching transistor 2 (17b) illustrated in FIG. 3 is turned OFF at time t7, whereas the switching transistor 1 (18b) illustrated in FIG. 3 remains in the OFF state. As a result, the relay-coil exciting current 20d illustrated in FIG. 5 decays between time t7 and time t9. FIGS. 4 and 5 are now compared with each other. A time period in which the relay-coil exciting current 20d illustrated in FIG. 5 decays, that is, a time period between time t7 and time t9 is shorter than a time period in which the relay-coil exciting current 20c illustrated in FIG. 4 decays, that is, a time period between t4 and time t6.

Moreover, FIG. 5 illustrates that the relay-coil exciting current 20d becomes equal to or smaller than the current value necessary for maintaining the relay-ON state at time t8 and therefore, the relay-contact open/closed state 21d transits from the closed state to the open state.

As described above, in case of occurrence of the abnormality, the relay contacts are interrupted while the relay-contact energizing current 19d is held in the energizing state. Therefore, the relay recovery time is reduced to ensure high-speed interruption performance.

As described above, the electric power steering device according to the present invention first lowers the target value of the relay-contact energizing current and operates the relay driving circuit 8, and then turns the fail-safe power relay 9b and the motor relay 10b OFF to gradually perform the relay-OFF operation as the normal relay-OFF operation. Therefore, the operating noise generated when the relay contact opens can be reduced.

Moreover, the electric power steering device according to the present invention turns the fail-safe power relay 9b and the motor relay 10b OFF without operating the relay driving circuit 8 in case of detection of the abnormality. As a result, the relay recovery time is reduced to enable a reduction in time of arc discharge generated between the relay contacts. As a result, the relay contact welding can be prevented. Therefore, the protection of the electric power steering device against the operation in the brake mode can be ensured to further improve the safety.

Accordingly, the highly reliable electric power steering device excellent in noiseless performance and comfort, which can further improve safety, can be realized.

What is claimed is:

1. An electric power steering device, comprising:
   electric-motor driving means for driving an electric motor for applying an assist torque to steering performed by a driver;
   at least one relay for interrupting power supply to the electric-motor driving means;
   steering-force detection means for detecting a steering force of the driver;
   control means for generating an electric-motor control signal for controlling an output torque of the electric motor based at least on results of detection by the steering-force detection means and outputting the electric-motor control signal to the electric-motor driving means;
   failure detection means for detecting an abnormality in the electric power steering device; and
   relay gradual interruption means including switch means connected in parallel to a drive coil included in the at least one relay and a diode connected in series to the switch means, wherein:
   the relay gradual interruption means is for turning the switching means ON so as to cause an amount of current corresponding to a back surge generated at ends of the drive coil to flow back to the diode when an exciting voltage of the drive coil of the at least one relay is turned OFF; and
   when the failure detection means does not detect the abnormality in the electric power steering device, the control means lowers a target value of a relay-contact energizing current, operates the relay gradual interruption means, and then interrupts the at least one relay, and
   when the failure detection means detects the abnormality in the electric power steering device, the control means interrupts the at least one relay without operating the relay gradual interruption means.

2. An electric power steering device according to claim 1, wherein the switch means of the relay gradual interruption means is configured by a semiconductor switching element.

3. An electric power steering device according to claim 1, wherein the at least one relay is provided between the electric-motor driving means and a power source thereof.

4. An electric power steering device according to claim 1, wherein:
   the electric-motor driving means includes an inverter circuit; and
   the at least one relay is provided between the inverter circuit and the electric motor.

* * * * *